3,437,468
ALUMINA-SPINEL COMPOSITE MATERIAL
Ludwig Edward Seufert, Boothwyn, Pa., assignor to E. I. du Pont de Nemours and Company, Wilmington, Del., a corporation of Delaware
No Drawing. Filed May 6, 1966, Ser. No. 548,077
Int. Cl. C08h *17/12;* C08g *51/12*
U.S. Cl. 51—298                                                9 Claims

ABSTRACT OF THE DISCLOSURE

A composite material composed of 35 to 55% magnesium aluminate spinel, 15 to 35% alpha alumina, and 20 to 40% of an elemental phase containing free silicon or a silicon-aluminum intermetallic is useful as a cutting edge or as an abrasive grain. This material is made by heating to a temperature of at least 1000° C. a molten pool of aluminum which is covered with a layer of magnesium silicate in finally divided form. The heating is continued until a dense solid mass is formed on the surface of the aluminum. This mass is the composite material.

---

This invention relates to a novel in situ-formed composite material and to a process for making it. It is more particularly directed to a refractory composite containing magnesium aluminate spinel, alpha-alumina, and an elemental metal phase containing free silicon and/or a silicon-aluminum intermetallic, and to a process for making it involving reaction of molten aluminum with a particulate magnesium silicate. The invention is also directed to an abrasive grain composed of finely divided particles of said composite material and to molded articles such as abrasive wheels, clutch facings, and brake linings comprising the abrasive grain and a binding agent. The invention is further directed to tools for cutting metals having as a cutting edge a mass of said composite material.

According to this invention a dense, coherent, substantially homogenous composite material is formed by a very simple and inexpensive process which comprises heating, to a temperature of at least about 1000° C., a pool of molten aluminum which is covered with a layer of finely divided particles of a magnesium silicate. Molten aluminum is apparently drawn by a wicking action into the layer of particulate material where it is partially oxidized, probably both by reduction of the silica in the silicate to form elemental silicon and by reaction with atmospheric oxygen, to form alumina. A portion of the alumina thus formed reacts with the magnesia to form spinel.

The product is an extremely hard, tough substance composed of about 35 to 55 weight percent spinel, about 15 to 35 weight percent alpha alumina, and about 20 to 40 weight percent of an elemental phase comprising at least one member of the group consisting of free silicon and a silicon-aluminum intermetallic. Free aluminum may also be present in the elemental phase. Ordinarily, free silicon, free aluminum, and a silicon-aluminum intermetallic will all be present in the elemental phase.

Density of the composite material of this invention approaches the theoretical density of the component substances. This is indicated by the fact that density as determined by mercury displacement and density as determined by air displacement agree to within about 2%. The composite is substantially free of amorphous, glassy material, in spite of the fact that metal silicates are used in their preparation. Average crystal size in the spinel and alumina phases is in general less than 0.5 micron, as indicated by the fact that X-ray line broadening is observed. No line broadening is observed when the crystals are above about 0.5 micron in diameter.

After completion of the reaction the product is separated from any remaining unreacted material. The product can then be crushed and ground to finely divided particulate form for use as an abrasive grain or it can be cut with a diamond saw to provide cutting edges for metal-cutting tools.

Magnesium silicates used in the process are preferably naturally occuring materials such as forsterite, anthophylite, tremolite, chondrodite, chrysolite and talc. Synthetic magnesium silicates can of course be used but the naturally occuring materials are entirely satisfactory and are preferred because of cost. Mixtures of particulate magnesia and silica can also be used. The preferred material for use in the process is talc.

Particle size of the magnesium silicate is not highly critical, but it should be sufficiently small that the aluminum will be drawn up into the silicate layer during firing. In general, the particles should be small enough to pass a 20 mesh screen, preferably small enough to pass a 100 mesh screen.

If desired, the magnesium silicate can be mixed with other particulate substances to impart special properties to the products. For example, the carbides of aluminum, boron, hafnium, niobium, silicon, tantalum, thorium, titanium, tungsten, vanadium, and zirconium can be used. The borides of hafnium, niobium, tantalum, titanium, tungsten, vanadium, zirconium, chromium, and molybdenum can also be used. Particle size of these materials if used should be similar to the particle size of the magnesium silicate.

Oxidation of aluminum does not proceed very far without a promoter. Magnesia is known to promote the oxidation of aluminum, but it is not a highly active promoter. Thus, it is often desirable to have present in the magnesium silicate layer a small percentage, say 0.1 to 2 percent based on the weight of the silicate, of a more active promoter such as an alkali metal oxide. Without such a promoter, the reaction proceeds very slowly. Most naturally occuring magnesium silicates contain sufficient alkali metal oxide as an impurity to preclude any necessity of adding additional promoter. If a very pure magnesium silicate is used, however, addition of a small amount of sodium oxide or sodium silicate or the like will improve the results. However, if excess alkali is present, the silicate may melt, thereby impeding the reaction with aluminum.

As stated above, the firing temperature should be at least 1000° C. Ordinarily a higher firing temperature, say at least 1300° C., and preferably at least 1400° C., will be required to achieve the reaction in a reasonable length of time. This is especially true if the magnesium silicate is used without additional promoter.

The ratio of aluminum to particulate filler refractory can vary widely. If a large excess of aluminum is used, the composite formed can be easily separated from the melt. If an excess of magnesium silicate is used it can be scraped or brushed off the top of the mass.

In the preferred practice the pool of aluminum is about one inch or less deep and the amount of magnesium silicate is sufficient to cause substantially all of the aluminum metal to be converted and become part of the refractory mass. Ordinarily, where the aluminum is about one half inch deep, the magnesium silicate layer should be about 1½ to 2 inches deep.

The process requires a container to hold the molten aluminum in contact with the magnesium silicate. The container must be of a refractory material, preferably one which is inert to the molten aluminum. The container may be a hearth of alumina powder, as illustrated in the example below.

If desired the process can be carried out continuously. A trough is continuously supplied with molten aluminum. At one end of the trough particulate magnesium silicate is continuously deposited on the surface of the aluminum. As the particulate layer moves from one end of the trough to the other, it is converted to the dense coherent composite on the surface of the aluminum. At the opposite end the composite is separated from the molten aluminum and cooled.

After the refractory composite has been separated from any remaining reactants and cooled to ambient temperature, it can be either crushed and ground to provide an abrasive grain, or it can be shaped with a diamond saw to provide cutting edges for metal-cutting tools.

Conventional mechanical size reduction equipment such as hammer mills, jaw crushers and gyratory crushers can be used to crush the material. For finer particles, ball mills, tube mills, fluid energy mills, or micropulverizers can be used.

The fineness of the grain will of course depend upon the intended end use. Particles of a size just small enough to pass through about a 4 mesh screen can be used, for example, to make a snagging wheel such as would be used to remove excess metal from cast steel. On the other hand, where the grain is to be used for polishing optical glass, the particles should be small enough to pass through a 325 mesh screen.

In making grinding wheels, the grain can be bonded in accordance with customary methods with thermosetting resins, glass, rubber, metals or ceramics. Glass-bonded grinding wheels comprising this grain exhibit exceptionally high tensile strengths, possibly due to the affinity of the glass for the $SiO_2$ which is undoubtedly present on the particles due to surface oxidation of the silicon metal. Polyimide resins are also particularly suited as bonding agents for making abrasive articles with the grain of this invention. The grain can be used alone or in conjunction with other abrasive grains such as alumina, boron nitride, and diamond. The ratio by volume of total abrasive grain to bonding agent in these grinding wheels will ordinarily be about 1:5 and 5:1, preferably between 1:3 and 3:1. The amount of course varies with the size of the grain and the particular bonding agent used.

Examples 2 and 3 below illustrate preparation of abrasive articles of this invention. Since the procedural steps are conventional once the novel grain is obtained, an extended discussion does not appear to be necessary.

In making high friction articles such as brake linings and clutch facings, about 2 to 30% of the grain may be combined with about 35 to 60% of a high temperature resin which serves as a bonding agent, about 20–45% of a fibrous filler which serves to provide the desired strength for mechanical handling, and about 5 to 20% of a metal filler which serves as a heat conducting material to minimize hot spots and provide even wear. The percentages specified are by weight. If desired, the metal filler can be eliminated.

Examples of suitable resins for the purpose are the phenolic, elastomeric, aromatic polyimide, aromatic polyamide, aromatic polyimide-amide, aromatic polyketone, aromatic polyimine, and aromatic polybenzotriazole resins. Fibrous fillers suitable for use include asbestos fibers and potassium titanate. Metal fillers which are suitable include copper, silver, and bronze, preferably in the form of fibrils in order to prevent roughness in operation.

Procedure in making the molded high-friction articles involves mixing the ingredients with sufficient liquid hydrocarbon to form a paste. The resultant blend is dried, then subjected to a molding pressure of about 2000 to 50,000 p.s.i. at a temperature of about 300 to 500° C.

The abrasive grit of this invention has numerous other uses. It can be used to make abrasive films on paper, or added to oil to make a lapping compound. It can be used for sand blasting, and it can be used to provide abrasion resistant surfaces on fan housings, wear plates, crusher surfaces, and the like.

The invention will now be further described by reference to the following illustrative examples.

Example 1

A plate of 1100 alloy aluminum (dimensions approx. 15.2 x 15.2 x 1.27 cm.) was placed on a base of powdered tabular alumina in an electric furnace and covered with a layer of talc (Sierra Supreme USP, Cypress Mines Corp., United Sierra Div., Trenton, N.J.) that was ground to a fineness such that substantially all of the particles passed through a 325 mesh Tyler screen. Depth of the talc layer was about 5 cm. The covered plate was then fired in air at 1400° C. for a period of 7 days.

The hard, dense, tough reaction mass was separated from the excess metal and talc and cooled to room temperature. Using a recording diffractometer (Phillips Electronic Instrument's Catalogue No. 42272/1 and 12206/50), X-ray diffraction analysis of a sample of the substance showed an average composition of about 45 weight percent magnesium aluminate, about 25 weight percent alpha alumina, and about 30 weight percent of an elemental phase consisting of silicon metal, aluminum metal, and a silicon-aluminum intermetallic. The compositions are accurate to about ±10%, absolute. Line broadening was observed in the X-ray diffraction pattern, indicating that the average crystal size in the spinel and alumina phases was less than 0.1 micron. Density of the substance as determined by air displacement (using an air comparison pycnometer, model 930, Beckman Instruments, Inc.) was 3.48 g./cc.; density as determined by mercury displacement was 3.47 g./cc.

Microstructure, determined by light metallographic techniques, showed a matrix of dense α-alumina, in which the spinel phase was dispersed. About 25% of the elemental phase was distributed in the form of spheroidal globules. The remainder of the elemental phase was apparently distributed as a second matrix, because the composite was elecrtically conductive. However, at the magnification used (750×) the phase was indistinguishable.

Example 2

The refractory mass produced in Example 1 was crushed, ground, and screened to yield a 120 grit product. This grit was blended in the ratio of 45:55 by weight with an aromatic polyimide resin binder, poly (N,N'-4,4'-oxydiphenylene pyromellitimide), and molded under heat (460° C.) and pressure (25,000 p.s.i.) around an aluminum core to form a grinding wheel, 5.08 cm. in diameter and 1.27 cm. in nominal thickness, with an approx. 0.32 cm. thick rim.

Excellent molding characteristics indicated unusual compatibility between the polymeric binder and the grit. In attempting to dress the wheel with silcon carbide and alumina hones, the wheel readily cut through the dressing materials. The surface of the wheel became very smooth and burnished but the surface was not worn down.

The grit can be used in wear resistant parts, friction materials, bearings, and seals, as well as in grinding wheels.

Example 3

Abrasive grit of the type used in Example 2 was blended with poly (N,N'-4,4'-oxydiphenylene pyromellitimide) and diamonds in the ratio of 15:40:45 by weight. The blend was then hot pressed around an aluminum core to form a 5.08 cm. (2") diameter, 0.63 cm. (¼") nominal thickness grinding wheel with a 0.32 cm. (⅛") deep rim. The wheel was then used to surface grind at controlled rates a 4" x 10" tungsten carbide segmented plate, removing successive layers at the rate of 5, 10, 15 and 20 mil thickness per pass. Performance of the wheel was considered to be equal to the performance of conventional high quality diamond grinding wheels.

Example 4

Abrasive grit of the type used in Example 2 was fabricated into experimental friction materials and evaluated in the laboratory for applications in clutch facings and brake linings. A composition was prepared consisting of 40% by weight poly (N,N'-4,4'-oxydiphenylene-pyromellitimide), 20% by weight of the abrasive grit, and the balance a combination of copper spheres and fibrils and asbestos fibers. A small amount of kerosene was added and the composition mixed in a high shear b'ender for a few minutes to form a paste-like slurry. The resultant blend was dried for 16 hours in a vacuum oven with a nitrogen bleed. Samples of the dried material were then hot pressed to provide test discs approx. 2.86 cm. in diameter and 0.32 cm. in thickness with a 0.16 cm. wide bearing lip at the periphery and having a hole in the center.

These discs were then evaluated by rotating them in rubbing contact with 1025 steel and cast iron surfaces on a special testing machine. Means of controlling and recording speed of rotation and pressure were provided. Surface speeds ranging from 3 to 1300 ft./min. and pressures ranging from 15 to 10,000 p.s.i. were used. A load cell attached to a torque arm of a spindle measured the response from which coefficient of friction and "stick-slip" were derived. In these tests, coefficients of friction greater than 0.3 were maintained at temperatures as high as 900° F. (482° C.). No "stick-slip" was observed throughout these pressure and temperature ranges.

The property fo "stick-slip," which is considered to be critical in the performance of friction materials, provides a measure of the sliding friction between two materials when rubbed together at low speeds. The natural tendency to release, then grab—release, then grab, is termed "stick-slip."

I claim:

1. A dense, coherent, substantially homogeneous composite material composed of about 35 to 55% by weight magnesium aluminate spinel, about 15 to 35% by weight alpha-alumina, and about 20 to 40% by weight of an elemental phase consisting of at least one member of the group consisting of free silicon and a silicon-aluminum intermetallic.

2. A composite material as defined in claim 1 wherein the elemental phase consists essentially of silicon, aluminum, and a silicon-aluminum intermetallic.

3. As an abrasive grain, a composite material according to claim 1 in particulate form.

4. An abrasive article comprising an abrasive grain as defined in claim 3 bonded within a matrix of a material selected from the group consisting of thermosetting resins, rubber, metals and ceramics.

5. A method of making a composite material of the character defined in claim 1 which comprises heating to a temperature of at least about 1000° C. a molten pool of aluminum which is covered with a layer of a magnesium silicate in finely divided particulate form, the heating being continued until a dense solid mass is formed on the surface of the aluminum, then separating the mass from any remaining molten aluminum.

6. A method as defined in claim 5 wherein the magnesium silicate is talc.

7. A tool for cutting metals having as a cutting edge the composite material of claim 1.

8. A molded article for use as a high friction lining or facing comprising 2 to 30% by weight of the abrasive grain of claim 3, 35 to 60% by weight of a high temperature synthetic resin and 20 to 45% by weight of a fibrous filler selected from the group consisting of asbestos fibers and potassium titanate.

9. The molded article of claim 8 containing in addition 5 to 20% of a metal filler selected from the group consisting of the fibrils of copper, silver and bronze.

References Cited

UNITED STATES PATENTS

| 2,805,167 | 9/1957 | McCreight et al. | 106—62 |
| 3,026,210 | 3/1962 | Coble | 106—62 |
| 3,285,761 | 11/1966 | Hare et al. | 106—62 |

FOREIGN PATENTS

| 697,231 | 9/1953 | Great Britain. |

DONALD J. ARNOLD, *Primary Examiner.*

U.S. Cl. X.R.

51—299, 308, 309; 106—62; 260—37, 38, 41.5; 117—100